Patented June 10, 1930

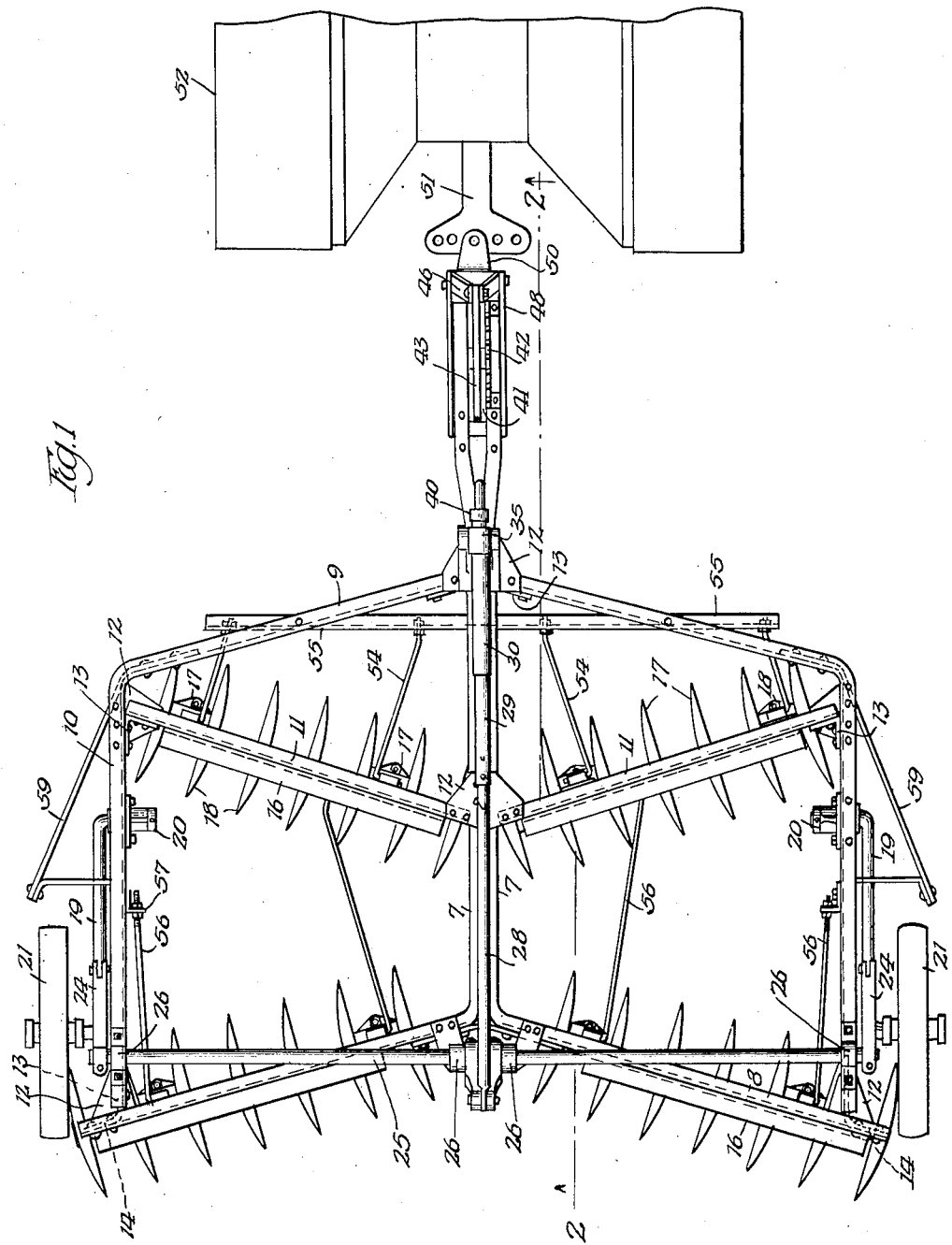

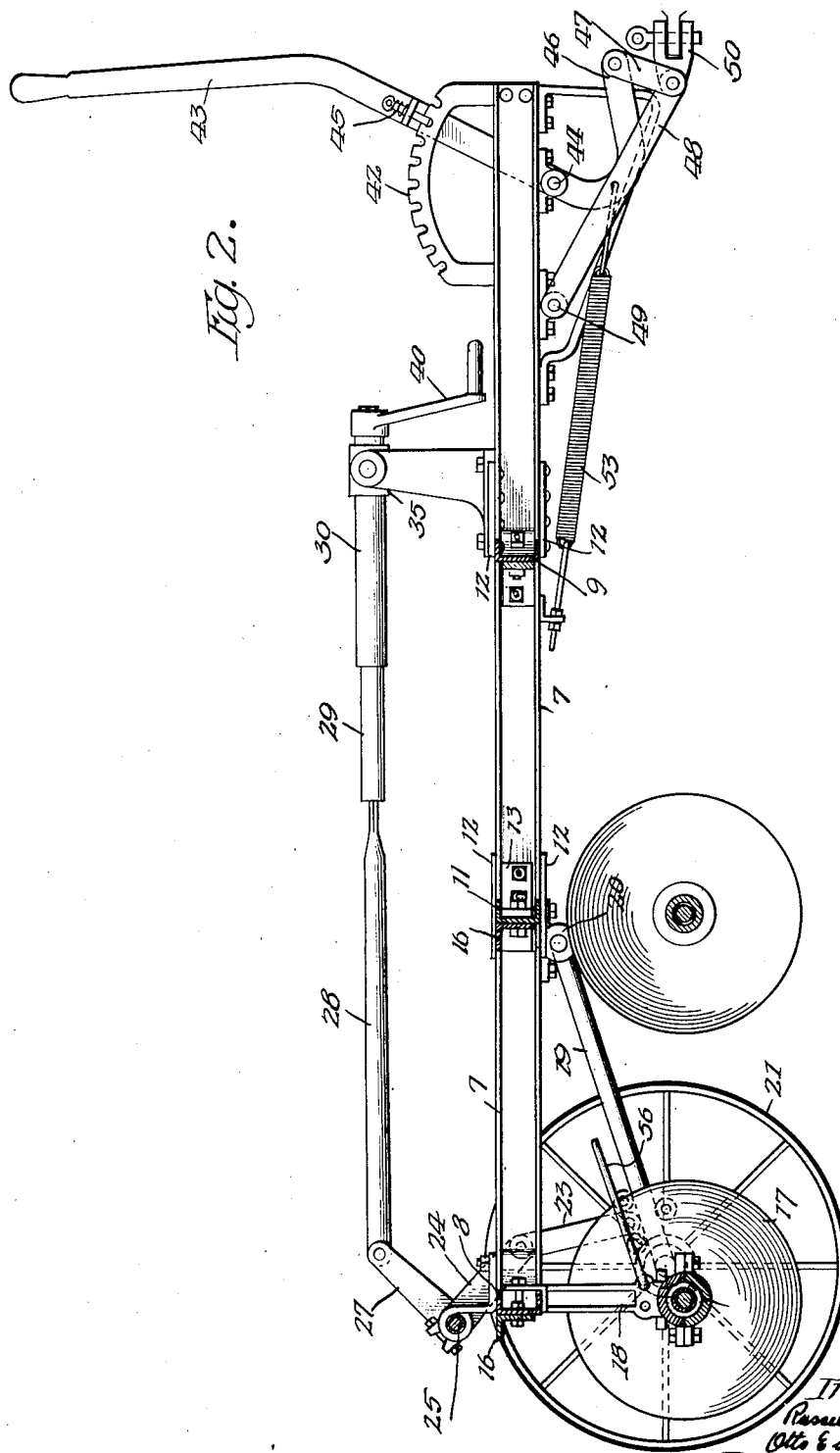

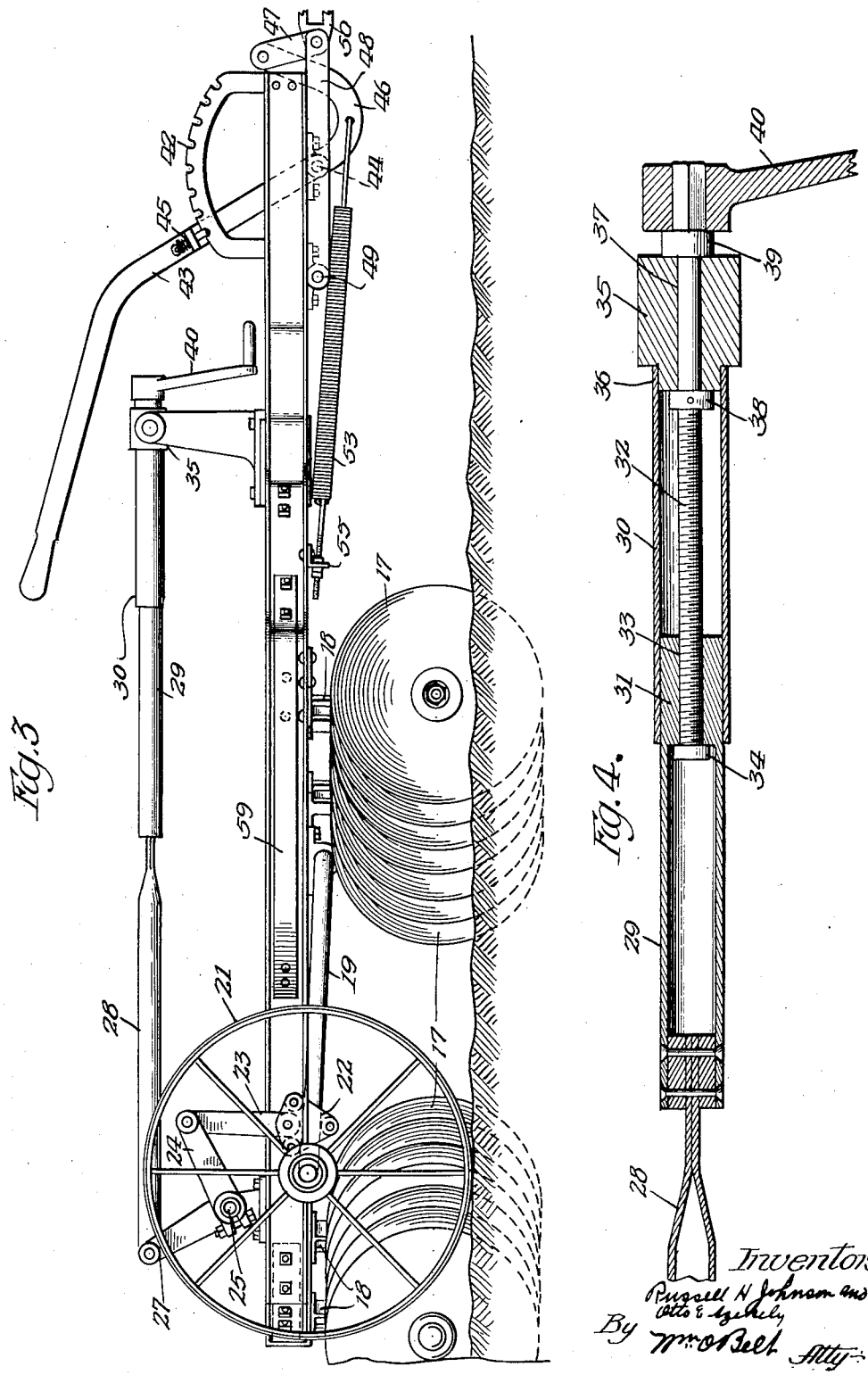

1,762,633

UNITED STATES PATENT OFFICE

RUSSELL H. JOHNSON AND OTTO E. SZEKELY, OF MOLINE, ILLINOIS, ASSIGNORS TO BROWN LYNCH SCOTT CO., OF MONMOUTH, ILLINOIS, A CORPORATION OF ILLINOIS

WHEELED HARROW

Application filed August 30, 1926. Serial No. 132,396.

This invention is an improvement on the disk harrow of U. S. Patent No. 1,531,278 patented March 31, 1925.

The object of the invention is to provide a rigid harrow of novel and improved construction comprising a rigid frame carrying the usual disk gangs and mounted on wheels adapted to be adjusted for regulating the depth of cut of the disks and also adapted to support the frame with the disks clear of the ground so that the harrow can be transported over paved and other roads without damaging the harrow or the roads.

A further object of the invention is to provide a rigid wheeled harrow of strong and substantial but simple construction which can be easily and accurately adjusted to control the position of the disk with respect to the surface of the ground.

Another object of the invention is to provide a wheeled harrow with gangs of disks disposed and arranged and adapted to be set to give a uniform depth of cut and to throw the dirt properly.

And a further object of the invention is to construct a wheeled disk harrow so that the gangs may be all arranged in one operation above the surface of the ground to enable the harrow to be transported over paved roads without damage and without violating any rules or regulations now or hereafter imposed by municipalities against transportation of harrows over paved roads.

In the accompanying drawings we have illustrated a selected embodiment of the invention and referring thereto:

Fig. 1 is a plan view of the harrow and a portion of a tractor to which the harrow is coupled.

Fig. 2 is a sectional view on the line 2—2 of Fig. 1.

Fig. 3 is a side elevation of the harrow.

Fig. 4 is a longitudinal sectional view of a portion of the adjusting means.

Referring to the drawings the frame comprises two L-shaped members each having a forwardly extending bar 7 and a laterally extending bar 8. The two bars 7—7 are arranged side by side centrally of the frame, and the two bars, 8, are located at the back of the frame and extend laterally from the rear ends of the bars 7, 7 and are inclined rearwardly. Two L-shaped braces are fastened to the frame members 7, 8; these braces each comprising a front bar 9 and a side bar 10. The front bars 9 are rigidly connected at their ends to the bars 7, 7 and the side bars 10 are rigidly connected at their ends to the rear bars 8 adjacent the outer ends thereof. The bars 9 are rearwardly inclined and are substantially parallel with the bars 8; the bars 10 are substantially parallel with the bars 7. We prefer to make the bars 7, 8 out of one piece of channel iron, and also to make the bars 9, 10 out of one piece of channel iron. Each set of bars 7, 8, 9, and 10 provides a substantially rectangular section and the two sections are rigidly secured together to form the frame of the harrow. The members 7, 8 and 7, 8 constitute, in effect, the frame, but the members 9, 10 and 9, 10 are rigid with these draft members and constitute rigid parts of the whole frame. Cross bars 11, 11 are rigidly connected to the bars 7, 7 and to the bars 10, 10. The inner ends of the cross bars are connected to the center bars 7, 7 substantially mid-way between the inner ends of the front bars 9, 9 and the inner ends of the rear bars 8, 8, and the outer ends of the cross bars are connected to the side bars 10, 10 substantially at the forward ends of the side bars 10, 10, so that the cross bars incline forwardly from the center bars 7, 7. It is desirable that the bars should be rigidly connected and for this purpose we provide top and bottom gussets 12 at the juncture of the front bars 9, 9 with the center bars 7, 7 and at the juncture of the cross bars 11, 11 with the center bars 7, 7. and bottom gussets 12 at the juncture of the side bars 10, 10 with the rear bars 8, 8; and we also provide angle plates 13 at the juncture of the front bars 9, 9 and cross bars 11, 11 with the center bars, and at the juncture of the cross bars 11, 11 with the side bars 10, 10. The ends of the side bars 10, 10 are rigidly fastened to the ends of the rear bars 8, 8 by angle bars 14. The cross bars are also preferably made of channel iron. A plate 15 overlaps the inner ends of the rear bars 8, 8 and is rigidly fastened thereto. Angle bars 16 are fastened to the rear bars 8, 8 and to the cross bars 11, 11 for the purpose of hanging scrapers. We have shown these bars with openings to receive scrapers for cleaning the disks. Since the scrapers form no part of this invention we have omitted them from the drawings, for clearness, and do not claim them herein, reserving the right to use any form of scrapers suitable for the purpose.

A gang 17 of disks is supported in brackets 18 under and by each of the bars 8, 8 and 11, 11. These gangs may be of any suitable construction and they are arranged substantially parallel with the bars by which they are supported. The brackets are rigid with the bars and they support the gangs rigidly so that the gangs and the frame comprise a rigid unit.

Arms 19 are arranged alongside and on the outside of the side bars 10, 10, the forward ends of these arms being bent laterally and inwardly and pivoted in bearings at 20 on the side bars. The rear ends of the arms 19 are bent laterally and outwardly to form axles upon which the carrying wheels 21 are mounted. Each arm 19 has a bracket 22 rigidly fastened thereon, and a link 23 is pivotally engaged at one end with the bracket and at its other end with a crank arm 24 rigidly mounted on the rock shaft 25 (Fig. 1). This rock shaft is mounted in bearings 26 on the side bars 10, 10 and on the rear bars 8, 8, and it is provided with a centrally disposed crank arm 27 which is pivotally connected at its outer end with the link 28 of the adjusting device (Figs. 3, 4). This adjusting device comprises two tubular members 29, 30, the former telescoping in the latter. The member 29 is connected at its outer end with the forward end of the link 28, and it has an integral head 31 at its inner end. A bar 32 is arranged in the member 30 and is screw-threaded in an opening 33 in the head 31 and provided with a stop 34 on its end. A plug 35 has a reduced end 36 which is arranged in the forward end of the tubular member 30 and the rod 32 projects freely through an opening 37 in this head and is provided with a collar 38 and a collar 39 at opposite ends of the head. A crank handle 40 is rigidly mounted on the outer end of the adjusting rod 32.

From the foregoing description it will readily be observed by reference to Figs. 3 and 4 that if the crank handle 40 is operated in a clockwise direction the tubular member 29 will be drawn into the tubular member 30, the shaft 25 will be rocked in its bearings, the crank arms 24 and link 23 will be lowered and the arms 19 will be swung downwardly to lower the wheels 21, but since the wheels 21 are resting upon the surface of the ground and can not lower the result will be to raise the frame which is, in fact, the result desired. And it will likewise be readily understood, referring to Fig. 2, that if the crank handle 40 is turned in a counter clockwise direction the tubular member 29 will be moved out of the tubular member 30 and the wheels will be lifted, the effect being to lower the frame, which, in this operation, is the result desired.

The front ends of the center draft bars are separated at 41 and a toothed sector 42 is secured between them (Figs. 2, 3). A lever 43 projects between the spaced front ends of the center bars and is pivotally mounted thereon at 44. This lever has a spring detent 45 to engage the sector for securing the lever in adjusted position. The lower end of the lever is made in the form of a hook 46 which projects forward and is connected by a link 47 with a coupling bar 48 which is pivoted at its rear end at 49 to the frame. At the front end of the coupling bar there is a clevis 50 by which it is connected to the draw bar 51 of the tractor 52 (Fig. 1). One end of the link 47 is pivotally connected to the forward end of the hook 46, and the other end of the link is pivotally connected to the coupling bar just behind the clevis. The pivot 44 of the lever 43 is located between the link 47 and the pivot 49 of the coupling bar. By operating the lever the clevis end of the coupling bar may be raised or lowered for convenience in coupling the harrow with the tractor and also for adjusting the forward part of the frame vertically to regulate the depth of operation of the forward gang. A tension spring 53 is connected at one end to the frame and at its other end to the hook 46 of the lever 43 tending to pull the clevis end of the coupling bar downward.

Our improved frame comprises a strong and substantial construction, and the brackets can be made sufficiently heavy to hold the gangs in proper position. But a harrow has to work in rough and uneven ground and it is subjected to severe jolts and jars. Therefore, we prefer to provide tie rods 54 which are connected to the forward gangs and to an anchor bar 55 which is fastened to the front bars 9, 9; also to provide the rear gangs with tie rods 56 which are connected to the outer ends of the gangs and to brackets 57 on the side bars 10, 10; also to provide tie rods 58 which are connected to the inner ends of the rear gangs and to the cross bars 11, 11. These tie rods will co-operate with the brackets 18 to hold the gangs in rigid position on the frame. We have provided a harrow of the rigid type covered by the Flately Patent 1,531,278, and which has been carefully designed for strength, for lightness and for effective operation in practical use. The whole frame and the disk gangs constitute a single unit adjustable vertically relative to the carrying wheels, and the means for adjustment are simple and substantial in construction and easily operated to raise or lower the entire unit relative to the two carrying wheels and to the coupling with the tractor. It will be understood that generally speaking the vertical adjustment is effected by operating the crank handle 40, but it may be desirable to vary the adjustment at the coupling with the tractor to conform with the adjustment of the rear end of the harrow, and this can be easily done whenever it becomes necessary or desirable. By adjusting the harrow unit as a whole relative to the wheels we are enabled to insure a uniformity of penetration and cut of the disk in the soil and this is a highly desirable result in the practical use of a harrow because it insures uniform treatment according to a predetermined plan of operation which the operator can rely upon in the use of the harrow. The forward end of the harrow is maintained by its coupling with the tractor at substantially a fixed distance above the ground level. Since the gangs are rigidly supported on a rigid structure they will always remain in their predetermined relation. The front gangs are set to throw the dirt outwardly, the rear gangs are set to throw the dirt inwardly. Practical operation of our harrow construction as herein described has demonstrated that the penetration and the cut of the disk are uniform and that the dirt is finely divided and evenly spread throughout the area over which the harrow travels. In many places laws and ordinances have been and are being passed forbidding the transportation of harrows over paved roads, except in trucks or by other means which will carry them out of contact with the rods, because of the damage which it is found they sometimes do to the pavement. The facility whereby the gangs can be lifted above the road level makes it possible to transport our harrow on its own wheels on paved roads without liability of damage thereto. This is also important to transporting the harrow on rough and uneven unpaved roads and lanes, and it facilitates the transportation of the harrow over fields. To protect the wheels 21 we may provide side guards 59 on the sides of the frame.

We have shown and described the harrow in a preferred embodiment which has been satisfactory in practical use, but it may be desirable to change the construction and arrangement of parts to meet different conditions and we reserve the right to make all such changes as fairly fall within the scope of the following claims.

We claim:

1. In a wheeled harrow, the combination of a rigid unit comprising a frame, a pair of wheels, means pivotally connecting the wheels to the frame, a rocking device on the frame for moving the wheels and frame relatively, and means for actuating said rocking device comprising two tubular members adapted to telescope one within the other, and a screw device operating to move one of said members in opposite directions in the other member.

2. In a wheeled harrow, the combination of a rigid unit comprising a frame, a pair of wheels, means pivotally connecting the wheels to the frame, a rock shaft on the frame, crank arms on said shaft loosely connected to said means, another crank arm on the shaft, and an adjusting device connected to said last mentioned crank arm adapted to be operated to adjust the wheels and frame relatively, said adjusting device comprising a pair of tubular telescopic members, and a screw within and engaged with said members to move one member in the other in opposite directions.

3. In a wheeled harrow, the combination of a rigid unit comprising a frame, a pair of carrying wheels, and means for moving said carrying wheels and frame relatively, said means comprising two tubular members one adapted to slide within the other, the inner member having a head at its inner end with a threaded opening therein, the outer member having a plug at its outer end with an unthreaded opening therein, a rod having a threaded portion to engage the threaded opening in said head and an unthreaded portion to engage the opening in said plug, and a crank handle on the outer end of said rod to turn the same.

4. A harrow comprising a rigid frame, a pair of wheels supporting the rear end of the frame, a lever pivotally mounted on the frame at its front end and having a forwardly extending hook below its pivot and below the frame, a coupling bar pivoted at its rear end to the frame behind the lever pivot, a clevis on said coupling bar for engagement with a tractor, and a link connecting the front end of the coupling bar with the free end of the hook whereby the lever may be operated to raise and lower the front end of the frame relative to the tractor, and means on the lever and frame for holding the lever in adjusted position.

RUSSELL H. JOHNSON.
OTTO E. SZEKELY.